United States Patent Office 2,700,668
Patented Jan. 25, 1955

2,700,668

PREPARATION OF KETOPIPERAZINES

James S. Strong and W E Craig, Philadelphia, and Vincent T. Elkind, Roslyn, Pa., assignors to Rohm & Haas Company, Philadelphia, Pa., a corporation of Delaware No Drawing. Application February 8, 1952,
Serial No. 270,761

7 Claims. (Cl. 260—268)

This invention concerns a method for preparing ketopiperazines having the formula

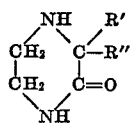

wherein R' represents hydrogen or an alkyl group of not over three carbon atoms and R" represents hydrogen or the methyl group.

These compounds are prepared by reacting ethylenediamine, a carbonyl compound, R'R"CO, and hydrogen cyanide with water being present during some stage of the reaction. The exact order in which the reactants are combined is not critical. Thus, ethylenediamine, carbonyl compound, and hydrogen cyanide may be combined in the presence of water, reacted with evolution of ammonia and the desired ketopiperazine separated. Or, carbonyl compound and hydrogen cyanide may be reacted to give a cyanohydrin which is then reacted with ethylenediamine in the presence of water. Again, ethylenediamine and carbonyl compound may be reacted to give an imidazolidine and water, which are then reacted with hydrogen cyanide to give the desired ketopiperazine.

The products find use in the fields of pharmaceuticals, solvents, softeners, textile assistants, etc.

The above reactants may be brought together and the initial reactions thereamong started at any convenient temperature between about 0° and about 90° C. At some stage in the reaction or in the separation of the desired products, however, the temperature is carried to at least 90° C. A suitable upper limit for the range of higher temperature to which the reaction mixture may be carried is about 190° C. This higher temperature may be attained during the reaction or during the separation of the desired products from the reaction mixture.

Carbonyl compounds useful for this reaction are formaldehyde, acetaldehyde, propionaldehyde, and butyraldehyde, acetone, methyl ethyl ketone, and methyl propyl ketone.

While ethylenediamine has been indicated as the diamine of choice, diprimary amines equivalent thereto in structure may likewise be used, such as, for example, 1,2-propylenediamine or 1,2-butylenediamine.

The products are most suitably separated from the reaction mixtures by distillation under reduced pressure. The distilled material may be further purified by crystallization.

Typical preparations are described in the following illustrative examples:

Example 1

To a mixture of 148 parts by weight of ethylenediamine and 1047 parts of water there was slowly added a 50% aqueous solution of glycolonitrile until 342 parts of this solution had been used. During this addition the mixture was stirred and cooled to maintain the temperature thereof below 34° C. The mixture was left standing for 16 hours at about 30° C. It was then heated to provide separation by distillation. The main fraction was taken off at 165° C./5 mm. When this distillate was cooled, it solidified. It was recrystallized from acetone. It then melted at 130°–135° C. and by analysis contained 27.2% of nitrogen, 48.6% of carbon, and 9.3% of hydrogen. Corresponding theoretical values for ketopiperazine are 28.0%, 48.0%, and 8.0%, respectively.

Glycolonitrile, as is known, is readily prepared by reacting formaldehyde and hydrogen cyanide. Cf. Preparation of Formaldehyde Cyanohydrin, p. 168 in "Preparation of Organic Intermediates" by Shirley, John Wiley & Sons, New York, 1951. See also, p. 176 of "Chemistry of Organic Cyanogen Compounds," Migridichian, 1947 ed. Glycolonitrile may also be prepared in the reaction mixture as described in the next example wherein formaldehyde and hydrogen cyanide are reacted in the presence of an amine catalyst.

Example 2

To 83 parts of a 36.3% aqueous formaldehyde solution there were added a trace of piperidine to serve as catalyst and 27 parts of hydrogen cyanide. During addition of the hydrogen cyanide the temperature was kept between 27° and 30° C. by cooling. After the cyanide had been added, the temperature of the mixture was allowed to rise to 50° C. The mixture was allowed to stand for 3.5 hours. This solution was then slowly added to 78 parts of 76.7% ethylenediamine in water, which was stirred and held at 100° C. This temperature was maintained for two hours after this addition had been completed. The reaction mixture was then distilled. The main fraction was taken at 170°–190° C./10 mm. When the product was cooled, it solidified. It was recrystallized from acetone and then melted at 132°–134° C. By analysis the solid contained 27.1% of nitrogen.

In the same way there may be reacted acetaldehyde, hydrogen cyanide, and ethylenediamine, the reaction mixture being heated to at least 90° C. in the presence of water and the product 3-methyl-2-ketopiperazine being separated as by fractional distillation at 143° C./1 mm.

Example 3

To a mixture of 120 parts of ethylenediamine in 253 parts of water there was added with stirring acetone cyanohydrin in an amount of 127.5 parts. The mixture during this part of the reaction was kept below 30° C. The mixture was then heated at 90° C. for eight hours. Ammonia was slowly evolved. The mixture was then distilled. At 140°–150° C./1.5 mm. there were obtained 119 parts of 3,3-dimethyl-2-ketopiperazine. Analysis of this product showed a nitrogen content of 21.3%, a hydrogen content of 9.5%, and a carbon content of 55.4%. Theoretical values are 21.9%, 9.4%, and 56.2%, respectively.

The same product is obtained by reacting acetone, hydrogen cyanide, and ethylenediamine. The reaction mixture is heated to at least 90° C. in the presence of water and 3,3-dimethyl-2-ketopiperazine is separated.

Example 4

To a mixture of 122 parts of ethylenediamine in 236 parts of water there was added lactonitrile to a total of 138.4 parts. This mixture was heated under reflux for 10.5 hours and then distilled. At 143° C./1 mm. a fraction of 134 parts of 3-methyl-2-ketopiperazine was collected. The distillate solidified when cool. It was recrystallized from ethyl acetate. It then melted at 65°–70° C. The nitrogen analysis thereof was 23%.

By closely parallel procedures there may be reacted methyl ethyl ketone, hydrogen cyanide, and ethylenediamine to give 3-methyl-3-ethyl-2-ketopiperazine, or butyraldehyde, hydrogen cyanide, and ethylenediamine to form 3-propyl-2-ketopiperazine.

We claim:

1. A process which comprises reacting in molar proportions a compound of the formula R'R"CO, hydrogen cyanide, and ethylenediamine, heating the reaction mixture to a temperature of at least 90° C. in the presence of water, and separating a ketopiperazine of the formula

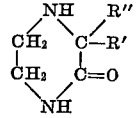

wherein R' is a member of the class consisting of hydrogen and alkyl groups of not over three carbon atoms and R" is a member of the class consisting of hydrogen and the methyl group.

2. A process which comprises reacting in molar proportions formaldehyde, hydrogen cyanide, and ethylenediamine, heating the reaction mixture above 90° C. in the presence of water, and separating 2-ketopiperazine.

3. A process which comprises reacting in molar proportions acetaldehyde, hydrogen cyanide, and ethylenediamine, heating the reaction mixture to at least 90° C. in the presence of water, and separating 3-methyl-2-ketopiperazine.

4. A process which comprises reacting in molar proportions acetone, hydrogen cyanide, and ethylenediamine, heating the reaction mixture to at least 90° C. in the presence of water, and separating 3,3-dimethyl-2-ketopiperazine.

5. A process for preparing ketopiperazines which comprises first reacting together in molar proportions hydrogen cyanide and a compound of the formula R'R''CO to form a first product, reacting this first product with ethylenediamine, heating the resulting reaction mixture in the presence of water, carrying the temperature of this reacting mixture to 90° to 190° C., and separating a ketopiperazine of the formula

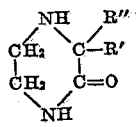

wherein R' is a member of the class consisting of hydrogen and alkyl groups of not over three carbon atoms and R'' is a member of the class consisting of hydrogen and the methyl group.

6. A process which comprises reacting in molar proportions lactonitrile with ethylenediamine in the presence of water, carrying the temperature of this reacting mixture to 90° to 190° C., and separating 3-methyl-2-ketopiperazine.

7. A process which comprises reacting in molar proportions acetonecyanohydrin with ethylenediamine in the presence of water, carrying the temperature of this reacting mixture to 90° to 190° C., and separating 3,3-dimethyl-2-ketopiperazine.

No references cited.